Patented Jan. 6, 1953

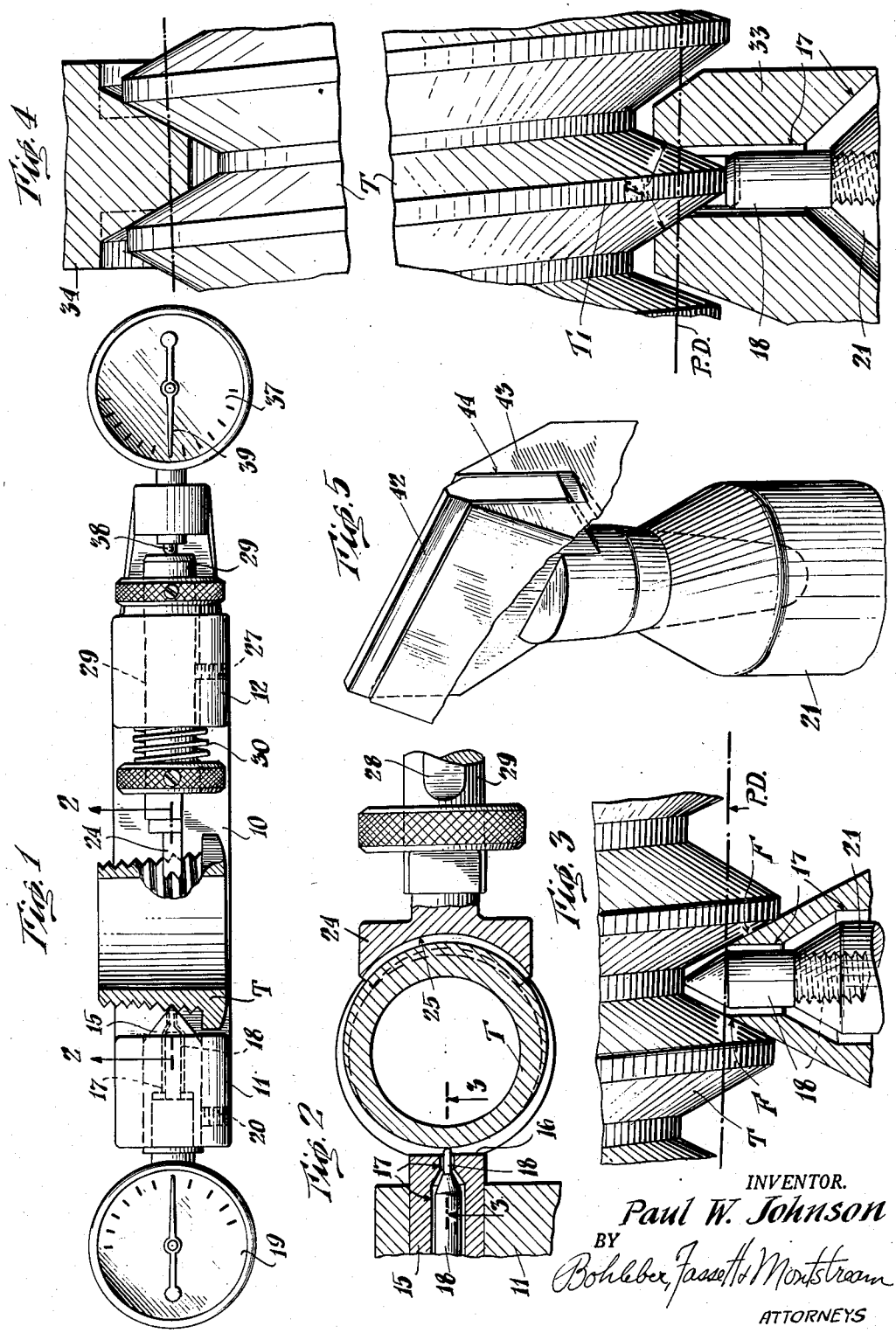

2,624,125

UNITED STATES PATENT OFFICE 2,624,125

SCREW THREAD GAUGE FOR ROOT AND CREST MEASUREMENTS RELATIVE TO THE PITCH LINE

Paul W. Johnson, Bloomfield, Conn., assignor to The Johnson Gage Company, Bloomfield, Conn., a corporation of Connecticut Application March 1, 1949, Serial No. 78,983

7 Claims. (Cl. 33—199)

The invention relates to a screw thread gage and is constructed primarily to gage so-called dry seal pipe threads which are taper threads. The gage checks the dimension between the pitch diameter of a thread and the minor or root diameter and a second gage of the same essential construction checks the dimension between the pitch diameter and major or outer diameter of the screw thread. With such dry seal screw threads it is necessary that there be no clearance between the root diameter of the external thread and the inner diameter of its threaded mating part as well as between the outside diameter of the external thread and the corresponding or cooperating maximum diameter of the mating thread. In such screw threads a clearance or space at one or both of these points would provide one or two spiral passages for leakage past or through the screw thread. The dry seal screw thread eliminates this clearance so that both the root and external diameters of the external screw thread contact with the corresponding minimum and maximum diameters of the internal screw thread carried by the mating part. The flanks of the external thread are at the same angle as and contact with the flanks of the mating internal thread. With a screw thread so constructed or dimensioned, there are no passages for leakage through the screw threads.

It is an object of the invention to gage a screw thread or determine whether or not the dimension between the pitch diameter or circle of the thread and the root or root diameter thereof and between the pitch diameter and the outside diameter is within allowable tolerances. That is, the dimension gaged with one gage is that between a point at the pitch diameter and a limiting thread dimension. This limiting thread dimension is either the root or the peak of the thread or both of these dimensions when utilizing two gages.

Another object of the invention is to construct a gage which secures the above object and at the same time determines whether or not the taper of the screw thread is proper or deviates from the desired taper.

Other objects of the invention will be apparent from the following description when taken in connection with the accompanying drawings illustrating preferred embodiments thereof in which:

Figure 1 is a plan view of the gage;

Figure 2 is an enlarged section taken on line 2—2 of Figure 1 of the portion of the gage which grips or holds the screw thread of the part to be tested and the gaging member or movable plunger;

Figure 3 is a partial enlarged sectional view through one of the cooperating or holding means and showing the gaging means and the contour of a portion of the screw thread of the test part for testing the dimension between a point on the pitch diameter and the root or root diameter of the screw thread;

Figure 4 is a partial enlarged sectional view of the cooperating or holding means and the gaging part of the gage and also showing a portion of the screw thread contour, for testing the dimension between a point on the pitch diameter of the screw thread and the peak or outside diameter thereof; and Figure 5 is an enlarged perspective view of a gaging member or movable plunger for fine threads and a portion of the cooperating means.

A dry seal taper screw thread is one in which the root and outer diameters of the mating threads contact each other, or provide a clearance which is so small that leakage cannot occur, as well as provide contact between the flanks of the mating threads. With a dry seal taper thread the pitch diameter may vary somewhat without detriment so long as it is not too great since the mating part merely rides farther up on the thread if the external thread is slightly undersize or does not ride as far up on the thread if the external thread is slightly oversize. In order that the mating threads shall seal against leakage both at the root of the external thread and at the outside diameter of the external thread as well as on the flanks, the dimensions thereto from the pitch diameter must be within close tolerances. The gage herein determines whether or not these dimensions upon the external thread are within proper tolerances and hence effect a dry seal fit. The gage may be used to gage these same dimensions in a straight thread; however, it finds its greatest usefulness with the dry seal type of taper thread. It is assumed that the angle of the flanks of the thread are proper with respect to each other and with respect to the axis of the test part. This is determined by the proper adjustment of the cutting tool in cutting the thread or may be tested after the thread is cut.

The gage includes a frame 10 which may be of U-shaped construction forming a pair of spaced arms 11 and 12. This frame may be suitably supported in known fashion upon the customary base. Each arm carries cooperating means for receiving and holding a threaded test part T therebetween. Each cooperating means carries either a ridge or groove having angular flanks corresponding with and engaging the angular flanks of the screw thread to be gaged. One cooperating means has a tapered ridge or so-called cone which is received in a groove of the test thread so that the cone or taper engages adjacent flanks of adjacent thread turns. The other cooperating means is a so-called V and engages the flanks of a single thread ridge or turn of the thread to be tested. The pair of cooperating means, therefore, are constructed to engage diametrically opposite sides of the thread of a test part.

The cooperating means 15 shown, has a straight edge 16 so that it will engage the test thread at one point or radial line on the periphery thereof. This cooperating means is fixed to the frame arm 11 in vertical position or preferably at a slight angle corresponding with the helix of the test thread. It may be either a cone or V depending upon whether the dimension to the root diameter is to be gaged or the dimension to the outside diameter of the thread is to be gaged. The cooperating means 15 is shown as a cone and hence the dimension between pitch diameter and root of the thread will be tested. The cone is deep enough to engage adjacent flanks F of adjacent thread turns at the pitch diameter PD or a portion of the flanks at the pitch diameter. The dimensions of the threads being gaged are sometimes so small that this desired result cannot always be achieved and a greater portion of the flanks of the thread is engaged and in fact may engage substantially the full flanks; however, this is unimportant if the flank angles are proper and there are no other thread faults which may affect the position of the test part within the cooperating means.

The fixed cooperating means 15 has a passage 17 therein in which a contacting plunger 18 is movable for engaging that part of the thread, the dimension or distance of which is to be gaged with respect to the pitch diameter. The passage and contacting plunger are centrally located within the cooperating means and will engage the root of the test thread when the plunger is a cone and will engage the peak of the thread when it is a V as will be discussed hereinafter. An indicator of any kind is connected with the contacting plunger to indicate the position of the plunger 18 relative to its position with a master thread within the cooperating means to which the gage has previously been set. The fixed cooperating means is constructed to engage the flanks of the test thread at or approximately at the pitch diameter of the thread as shown in Figure 3 so that the comparison made is of a dimension between the pitch diameter and the root of the thread. In the preferred construction, the central passage 17 extends through the fixed cooperating means 15 and a dial indicator 19 is secured in the passage as by a screw 20. The dial indicator carries an operating plunger or member 21 and the movable contacting plunger 18 extending to the thread may be mounted upon or secured to the operating plunger of the dial as by being threaded thereto as shown in Figure 3.

The other cooperating means 24 is shown as having a concave surface 25 in order to provide a cradle for the test thread which with the contact at one peripheral point provided by the fixed cooperating means 15, provides the equivalent of a three point peripheral engagement for the test part between the cooperating means. Preferably the extremities or ends of this cooperating means engage the test thread at two spaced points around the periphery thereof. The simplest method of constructing the cradle is to have a concavity or a diameter therefor slightly less than that of the thread of the test part so that the ends thereof engage the test part to provide spaced two point contact around the periphery thereof. Also since the fixed cooperating means 15 is a cone, the cooperating means 24 will be a V to engage the flanks of one thread turn or to straddle the thread turn. This places the cooperating means diametrically opposite from each other with respect to the test part or in a plane which is perpendicular to the axis of the test screw thread.

The cooperating means 24 is mounted for movement towards and away from the fixed cooperating means. The mounting particularly shown provides a slidable movement in the arm 12 of the frame. It is held against rotation by the end of a screw 27 contacting a flat 28 on the stem 29 of the cooperating means. A spring 30 normally propels this movable cooperating means towards the test part and the fixed cooperating means.

In order to insert a test part within or between the cooperating holding means 15 and 24, the movable cooperating means 24 is retracted against the compression of the spring 30 and the test part T is inserted therebetween. Upon release of the movable cooperating means it comes into contact with the test thread and with the fixed cooperating means holds the test thread with a three point peripheral contact between the extremities of the concave surface 25 of the movable cooperating means and a single peripheral point or a line upon the flanks of the screw thread turn on the fixed cooperating means 15. The movable contacting plunger 18 engages the root of the test thread, as in Figure 3, or engages the peak or crest in the gage constructed as in Figure 4. Since both cooperating means engage the test thread at, in proximity to, or in an area at the pitch line of the thread, the indicator determines whether the dimension from a point at the pitch line of the thread to the root of the thread is within the allowable tolerances as in Figure 3. The reading as compared to that for a master thread to which the gage was first set is shown on the dial indicator 19.

For a gage to determine whether or not the dimension between a point on the pitch line and the peak or outside dimension of the thread is within the allowable tolerances, the cooperating means of Figure 4 are used which is a reversal of that of Figure 3. In Figure 4, the fixed cooperating means 33 is a V, that is, it straddles the thread turn T₁ and engages the flanks F of the single thread ridge or turn. The movable cooperating means 34 is a cone with the concave surface 25 of, and in all other respects it is like, the movable cooperating means 24. This gage compares the dimension between a point on the pitch line PD of the thread and the top, peak or outside dimension of the screw thread with that of a master thread to which the gage was first set in order to determine whether or not this dimension of the test thread is within the allowable tolerances for a dry seal thread.

The gage may also be used to determine whether or not the test part has a proper taper. This is accomplished by providing an indicator such as the dial indicator 37 which is operated by changes in the position of the movable cooperating means, In the construction shown, the operating plunger 38 of the dial indicator is operated by the stem 29 for the movable cooperating means 24 as by engaging the end thereof. In order to determine whether or not the test thread has a proper taper, the test part may be rotated until the dial indicator 37 reads zero. The test part is then rotated a half or a full revolution whereupon a reading is made upon the dial indicator. For a proper taper this reading will be so many divisions of movement of the pointer 39 on the dial which will be proportional to whether or not a half turn or a full turn of the test part is made. Any deviation from the calculated number of divisions over which the pointer should move for a proper taper or as determined by the extent of movement of the pointer when a master thread is rotated therein, will indicate the deviation from a proper or desired taper. If the pointer moves over an excess number of divisions, a taper greater than that desired is indicated and likewise if the pointer moves over a lesser number of divisions, a taper less than that desired is indicated. The gage so constructed therefore is a dual purpose gage.

For a fine thread, the movable plunger 18 may be too small for convenience in assembly and manufacture and may lack sufficient stiffness in which case the plunger may be a blade or flat member 42, as shown in Figure 5 which is secured to the operating plunger 21 of the indicator in any desired fashion, a taper connection being shown. The fixed cooperating means 43 is like 15 except that it carries a slot 44 in which the blade 42 is movable. This gives increased rigidity to the movable plunger for fine screw threads when a circular movable plunger 18 may be undesirably small.

It will be noted that the movable plungers 18 of both Figures 3 and 4 are provided with clearance in their central passages 17. This merely provides free movement for the plunger and dispenses with accurate centering of the plunger with respect to the passage.

The fixed cooperating means 15 and 33 have been described as engaging one peripheral point on the test part. The means engages two flanks of the thread whether it be of V or cone form which points of engagement are at one peripheral point; that is, they are not circumferentially spaced and hence the engagement is at one peripheral point. The movable cooperating means also engages two flanks of the test thread at each of two points spaced from each other around the periphery of the test thread.

The invention is presented to fill a need for improvements in a screw thread gage for root and outside dimension relative to pitch diameter. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A screw thread gage for a threaded test part comprising a frame, a pair of spaced cooperating means carried by the frame to hold a test part therebetween, one of the pair of cooperating means being a cone form to engage in a single thread groove and the other being a V form to engage the flanks of a single thread of the test part opposite the cone form, one of the cooperating means being fixed to the frame, mounting means resiliently supporting the other cooperating means for movement towards and away from the fixed cooperating means, the cooperating means engaging the flanks of the test thread at or approximately at the pitch line, the fixed cooperating means having a form to engage two flanks of the test thread at one peripheral point, the movable cooperating means having spaced points engaging two flanks of the thread of the test part at each of two spaced points around the periphery thereof, the fixed cooperating means having a central passage therein, a movable plunger within the central passage of the fixed cooperating means to engage the test thread at a limiting thread dimension, and an indicator connected with the plunger to indicate the position thereof.

2. A screw thread gage as in claim 1 in which the central opening in the fixed cooperating means extends therethrough, the indicator having an operating member, the indicator being secured in the central opening with the operating member therein, and the movable plunger being carried by the operating member and extending through the end of the central opening to engage a diameter of the thread of the test part.

3. A screw thread gage as in claim 1 in which the fixed cooperating means is a V form engaging the flanks of a thread of the test part and the movable cooperating means being a cone form, and the plunger carried by the fixed cooperating means engaging the peak of the thread of the test part.

4. A screw thread gage as in claim 1 in which the fixed cooperating means is a cone form engaging the flanks of the groove of the thread of the test part and the movable cooperating means is a V form, and the plunger carried by the fixed cooperating means engaging the root of the thread of the test part.

5. A screw thread gage as in claim 1 including an indicator carried by the frame and engaging the mounting means for the movable cooperating means.

6. A screw thread gage as in claim 1 in which the central opening in the fixed cooperating means is a slot, and the movable plunger carries a contact blade movable in the slot.

7. A screw thread gage for a taper threaded test part as in claim 1 and an indicator connected with the movable cooperating means to indicate the position thereof.

PAUL W. JOHNSON.

REFERENCES CITED

The following references are of record in the file of this patent:

UNITED STATES PATENTS

| Number | Name | Date |
| --- | --- | --- |
| 1,362,558 | Byshe | Dec. 14, 1920 |
| 1,392,313 | Fallow | Oct. 4, 1921 |
| 1,423,339 | Ledell | July 18, 1922 |
| 1,547,514 | Mueller | July 28, 1925 |
| 2,210,561 | Allen et al. | Aug. 6, 1940 |
| 2,271,217 | Allen et al. | Jan. 27, 1942 |
| 2,432,160 | Johnson | Dec. 6, 1947 |